Figure 4:
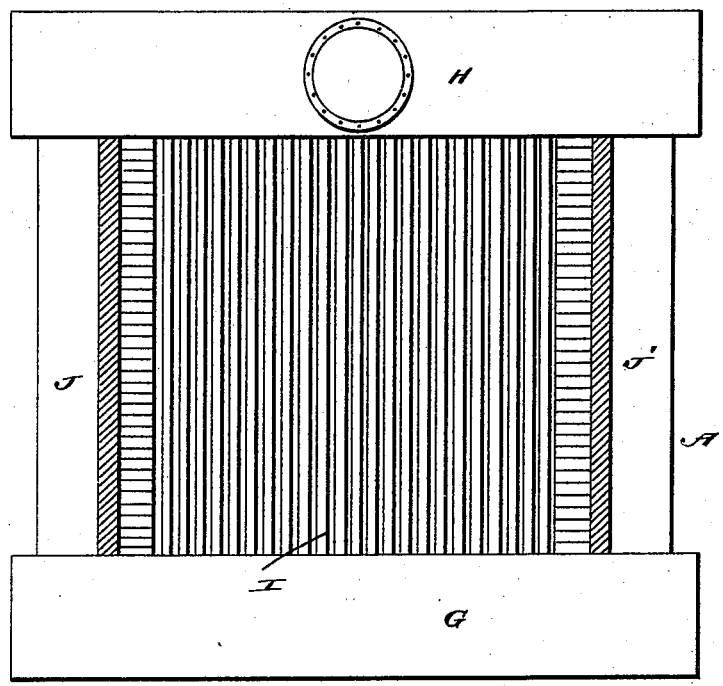

(No Model.) 3 Sheets—Sheet 1.
J. R. PETERS.
APPARATUS FOR MANUFACTURING WATER GAS.
No. 516,226. Patented Mar. 13, 1894.
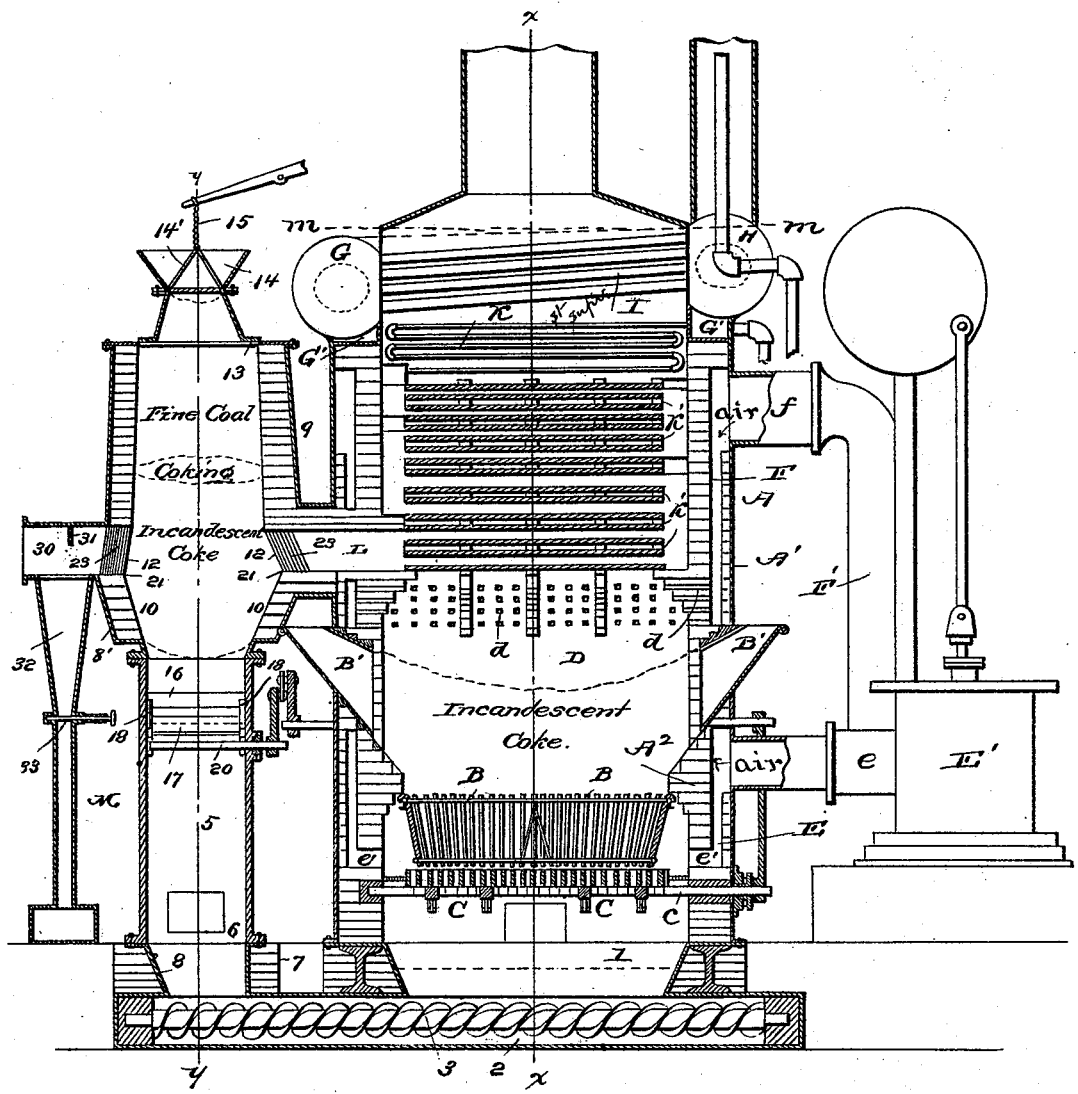

(No Model.) 3 Sheets—Sheet 2.
J. R. PETERS.
APPARATUS FOR MANUFACTURING WATER GAS.
No. 516,226. Patented Mar. 13, 1894.
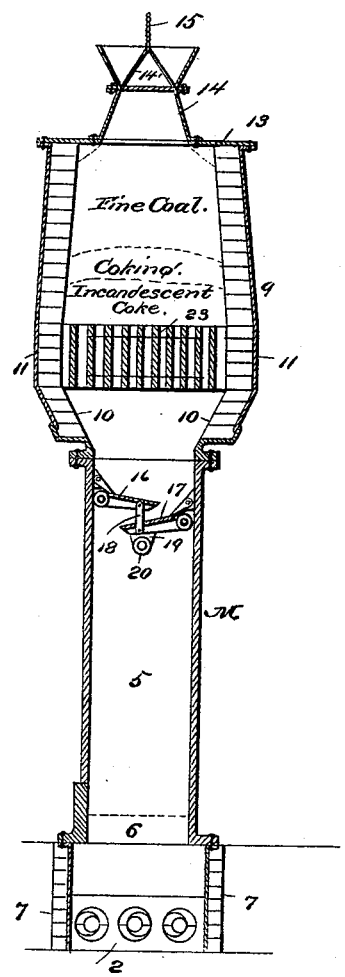
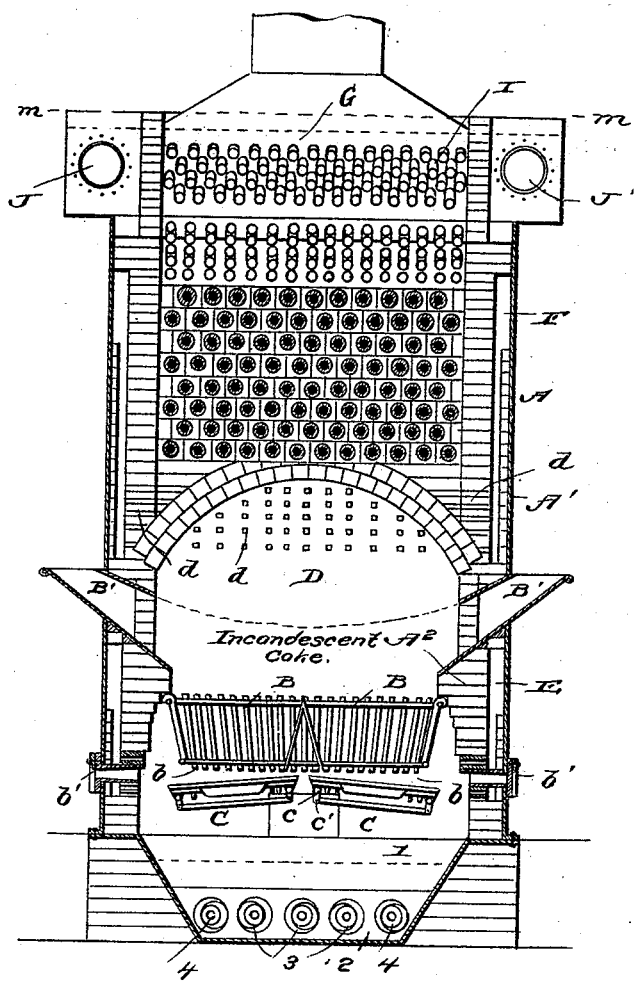

(No Model.) 3 Sheets—Sheet 3.

J. R. PETERS.
APPARATUS FOR MANUFACTURING WATER GAS.

No. 516,226. Patented Mar. 13, 1894.

Witnesses:

Inventor:
John R. Peters
By Edson Bros,
Attys.

UNITED STATES PATENT OFFICE.

JOHN R. PETERS, OF GEORGETOWN, PENNSYLVANIA.

APPARATUS FOR MANUFACTURING WATER-GAS.

SPECIFICATION forming part of Letters Patent No. 516,226, dated March 13, 1894.

Application filed October 3, 1892. Serial No. 447,705. (No model.)

*To all whom it may concern:*

Be it known that I, JOHN R. PETERS, a citizen of the United States, and a resident of Georgetown, in the county of Beaver and State of Pennsylvania, have invented certain new and useful Improvements in Apparatus for Manufacturing Water-Gas; and I do hereby declare the following to be a full, clear, and exact description of the invention, such as will enable others skilled in the art to which it appertains to make and use the same.

My invention relates to a rapidly-acting generator for manufacturing water-gas produced by the dissociation of steam into its component elements, forming a gas by combining one or more of these elements with other products of combustion from a bed of incandescent fuel, the steam being intensely superheated in a separate furnace through which it is conducted without coming in contact or intermingling with the products of combustion in such superheating producer furnace, and such intensely super-heated or red hot steam being carried directly and rapidly into and through the bed of incandescent fuel contained within a second generator furnace, thereby instantaneously converting such intensely-superheated steam into an independent highly-combustible homogeneous gas adapted to be used principally for heating purposes, but which, by suitable carburization, may be used as well for illuminating purposes.

The object of my invention is to construct a simple, continuous and very rapid acting apparatus for generating water-gas designed to utilize any suitable kind of fuel, in connection with exhast steam, which gas may be used by consumers in lieu of, and as a substitute for, natural gas, coal and other fuels generally used, and which will be more economical, convenient and cleanly for the public to use, and reduce to a minimum the labor, dust, dirt and room required.

A further object of my invention is to consume the fuel, necessary to generate the steam to be supplied to the various engines or motors employed for the operation of the plant, in a more economical manner and effect the thorough burning of the fuel and the resulting products of combustion, as well as to utilize the heat in such furnace to intensely superheat the steam, without permitting it to intermingle with such products of combustion in the primary superheating producer furnace, before conducting such steam to the bed of incandescent fuel in the gas generator furnace.

With these and such other ends in view as pertain to my invention, I employ a primary superheating producer furnace and a water-gas generator-furnace which are directly coupled together at an intermediate point of their length in such manner as to permit the intensely superheated steam from the primary furnace to pass directly through the bed of incandescent fuel contained in the generator furnace, thereby permitting a volume of oxygen in the steam to combine with an equal volume of carbon-vapor abstracted from the bed of incandescent fuel by the action of the rapidly passing superheated steam thereon, thus producing two volumes of carbonic oxide gas which combine with an equal volume of hydrogen gas set free from the steam (by the oxygen leaving the steam to join the carbon vapor;) such intermingling or combination carbonic oxide gas and hydrogen gas forming the water-gas.

The invention further consists in the novelties of construction and in the combination and arrangement of devices as will be hereinafter more fully described and claimed, whereby to simplify, improve and vastly increase the production, and reduce the cost, of water-gas and render it one of the best and cheapest substitutes for natural gas.

The accompanying drawings, forming a part of this specification, illustrate my apparatus for rapidly and continuously manufacturing water-gas, referring to which—

Figure 5:
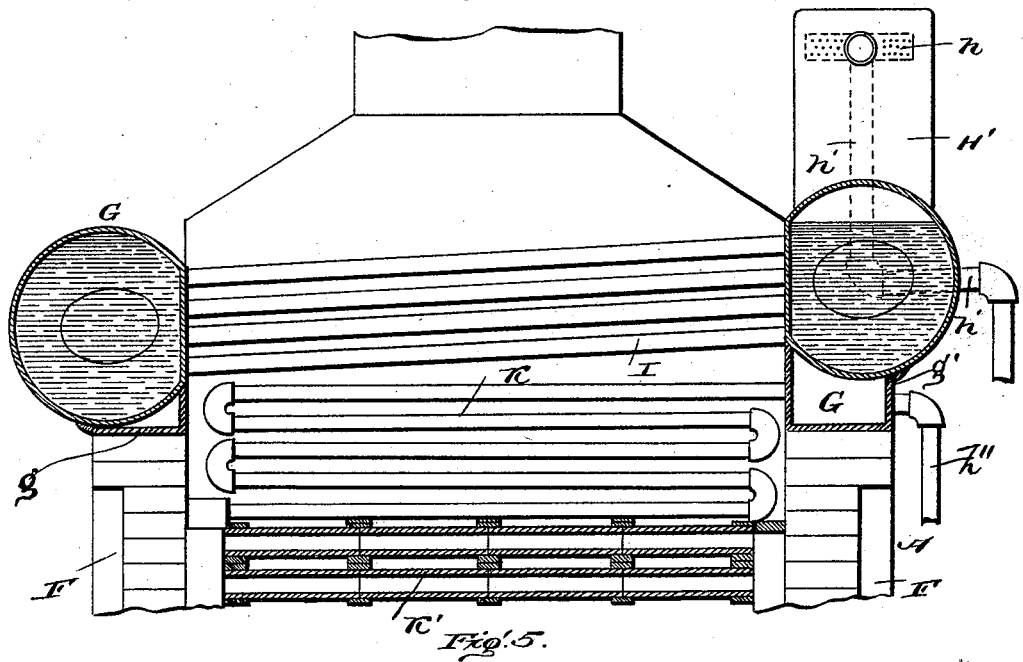

Figure 1 is a vertical central sectional view through the superheating producer furnace and gas-generating furnace, illustrating the method of conducting the superheated steam from one furnace to the other. Fig. 2 is a vertical sectional view through the superheating producer furnace on a plane at right angles to Fig. 1, and indicated by the dotted line $x$—$x$ in said Fig. 1. Fig. 3 is a similar vertical sectional view through the gas-generating furnace on a plane at right angles to Fig. 1 and on the line $y$—$y$ in said figure. Fig. 4 is a horizontal sectional view through the steam boiler in the upper part of the superheating producer furnace, on the plane indicated by the dotted line m, m, of Figs. 1 and 2; and Fig. 5 is an enlarged vertical sectional view through the boiler, and a part of the steam superheater, in the upper portion of the superheating producer furnace.

Like letters and numerals of reference denote corresponding parts in all the figures of the drawings.

In my apparatus for the rapid manufacture of water-gas, I employ a superheating producer furnace A designed to generate the steam necessary to operate the engine, or various engines, required to do the mechanical work in connection with the plant, the exhaust steam from which engine or engines is conducted back to said superheating producer furnace and passed through the same so as to be intensely superheated therein by the intense heat generated in the same. This furnace A thus serves a two-fold purpose, i. e., to generate the steam for the operation of the engine or engines and for intensely superheating the steam to be used in the manufacture of the gas, and thus the heat of the furnace is utilized to the best advantage and economy is effected in the manufacture of the gas as separate steam generating boilers for supplying power to the engine or engines are dispensed with. This superheating producer furnace is designed and constructed to effect the combustion of solid fuel and the products of combustion resulting therefrom in a manner somewhat similar to blast-producing furnaces used in reducing iron ore, so as to reduce to a minimum the loss of energy due to the escape of the carbon and other combustible gases in the products of combustion which are ordinarily allowed to escape from the stack; and to supply the air necessary to maintain combustion of the solid fuel on the grates in the lower part of such furnace and to feed the required volume of air, at the proper pressure, to the combustion chamber so as to commingle with the smoke and products of combustion arising from the burning of such solid fuel, I employ two independent positive pressure blowers which are of such capacity as to produce two currents of air of the required volume and pressure, each air current being heated by contact with the walls of conduits provided in the masonry of the furnace before it is admitted to the chambers thereof.

I will now proceed to a detailed description of the preferred embodiment of my superheating producer furnace A shown in Figs. 1, 2, 4 and 5 of the drawings, and this furnace has a metal jacket A' lined interiorly with suitable refractory material as A², preferably formed of fire-brick as indicated. In the lower part of this furnace A are arranged the basket grates B, B, and below said basket grates are the shaking grates C, C, a narrow space b being left or provided between the basket and shaking grates by properly spacing the two sets of grates; and the ashes and cinders which are liable to lodge and accumulate between the two grates can be removed by poke-bars adapted to be thrust and manipulated through poke-holes provided in the vertical walls of the furnace, such poke-holes being securely closed by tightly-fitting doors b', shown in Fig. 2. The rocking grates C, C, have their grate bars mounted on suitable rock-shafts c, which have crank-arms linked together at c'; and one of these rock shafts is extended outside of the furnace to adapt suitable devices to be connected thereto for operating said shaking-grates from a suitable engine. The basket grates B, B, each have the walls thereof inclined downward and inward so that the lower discharge part thereof is smaller than the upper receiving end, to facilitate the progress of the fuel or ashes through said grates; and the fuel is fed to the grates B, B, through the inclined chutes B' provided in the vertical walls of said furnace. These chutes B' are so located that their lower ends are adapted to discharge into the basket-grates, and said chutes are tapered longitudinally, being enlarged gradually from their outer ends toward the inner ends to cause the fuel to pass evenly and freely through them, without liability of clogging. The basket grates are filled with the fuel, which also rests on the shaking grates, and the bed of incandescent fuel in the producer furnace extends some distance above the level of the basket-grates, substantially flush with the feed-chutes.

In a producer furnace adapted for use in connection with a steam superheater and gas generator furnace forming an apparatus for the rapid manufacture of water gas, a very large grate is necessary to burn a very large amount of coal in a short time without making slag or clinker, and inclined shaking bottom grates are also very necessary to prevent ashes from collecting and interfering with the air blast through the fuel on the grates; and if pieces of fire clay, stone or other refuse are supplied with the coal, or if small pieces of clinker are formed, they are prevented from growing from accretion, move down the inclined shaking-bottom grates and pass off under the basket grates through the space left for them or through the space left between the inner adjacent ends of the shaking bottom grates, the latter being shaken from time to time by rocking the shaft C and cause the cams to vibrate the bottom grates.

Above the bed of incandescent fuel and the feed chutes in the furnace A is a combustion chamber D into which the products of combustion resulting from burning the solid fuel on the grates, are discharged; and to properly sustain combustion of the fuel on the grates and to thoroughly consume the products of combustion in the chamber D above said grates, I provide two independent air conduits or flues indicated at E, F, and each is supplied with the proper volume of air, under the required pressure, from one of two piston blowers or compressors E', F', (see Fig. 1.)

These blowers or compressors may be of any suitable type familiar to those skilled in the art, but I prefer to employ positive-pressure blowers by which the air blown in the producer furnace A can be accurately measured, and which can be run at variable speed, so that the right proportions of air to be blown under the grate, and into the combustion chamber to produce the best results in the most economic manner, can soon be determined. The lower air conduit or flue E is preferably formed in the masonry or fire brick lining of the shell A', and it extends entirely around said shell, the air being admitted from the connecting pipe $e$ to the upper part of the flue E and being discharged from the lower part of said flue through the short transverse passages $e'$, $e'$, which open into the lower chamber of the furnace A opposite to or beneath the grates therein, as may be preferred. The upper air conduit or flue F is likewise formed in the masonry or refractory lining A' of the furnace shell, and it extends vertically a suitable distance along the length of the furnace and entirely around the same.

The compressed air from the blower F' is supplied to the upper part of the upper flue F by a connecting pipe $f$, and the air in this flue F is conveyed in small thin streams to the combustion chamber D by a multiplicity of small passages $d$, $d$, arranged in four or more series, and extending entirely around the wall of the furnace so as to supply air to said chamber at all times.

In order to properly and thoroughly consume the products of combustion in the chamber D, it is important to thoroughly commingle the air from the flue F with such products of combustion, and to introduce the air by means of a blast of a pressure sufficient to force the thin divided streams of air to the center of the combustion chamber. These ends are perfectly attained by my invention, as the small transverse flues $d$ are arranged to divide and discharge the heated current of air from the flue F directly into the products of combustion in the chamber D and the blower F' can be regulated to supply the required volume of air, under the proper pressure, to the air conduit or flue F to be properly heated before its entrance to the combustion chamber D.

The current of air supplied by the blower E' and the flue E to the fire on the grates is required to be of higher pressure than the air supplied by the blower F' and the flue F to the combustion chamber D, in order to properly maintain the combustion of the solid fuel in the grates; and it is therefore important to employ two independently acting air blowers or forcers which can be separately regulated to supply two independent air currents, of different pressures, although about the same volume, to the bed of incandescent fuel on the grates and to the products of combustion in the chamber D, whereby I am enabled to thoroughly consume the fuel and secure the maximum heat from the fuel supplied to the furnace.

To utilize the heat generated in the primary producer furnace A, I provide a steam boiler in the upper part of the furnace, and a steam superheater situated between the steam generator and the combustion chamber D, such superheater being thus located in the hottest part of the furnace so as to heat the steam as it passes through the furnace to the highest degree that is possible in this apparatus. The steam generator or boiler consists essentially of two cylinders G, H, a series of transverse connecting tubes I, and two large circulating pipes J, J'. The cylinders G, H, and the circulating pipes J, J', are located practically outside of the passage provided in the furnace for the escape of the waste heat and gases resulting from the combustion in the furnace, but the connecting tubes or coils I of the steam generator extend horizontally across the passage or stack so that they are directly exposed to the heat, &c., passing through said passage or stack. One of the cylinders G of the generator is arranged on a lower horizontal level than the other cylinder, to insure good circulation of the water and steam in said tubes and cylinders and to effect the separation of the steam generated from the hot water; and the steam accumulates in a vertical drum H' provided on the upper side of the higher cylinder H, as shown by Figs. 1 and 5. The steam for supplying the motive power to the engine, or engines, necessary for the operation of the plant, is fed to the perforated drum $h$ in the upper end of the steam dome H', and thence to the pipe $h'$ which leads from the perforated drum to the engine or engines (not shown). The lower horizontal cylinder G of the steam generator rests on a saddle $g$ fixed to the top edge of one of the vertical walls of the producer furnace A, and the other higher horizontal cylinder H rests on a saddle $g'$ provided in the upper side of a steam receptacle G' which is suitably fixed to the top of another wall of the furnace A, said steam receptacle having an exhaust steam pipe $h''$ connected thereto for conveying the exhaust steam from an engine, or engines, to said steam receptacle G', which exhaust steam is designed to be intensely superheated in the superheater of the furnace A and to be utilized in the manufacture of the water-gas. The cylinders G, H, are, except on their opposing adjacent sides, made cylindrical in cross section; and to these flat sides of the cylinders are fastened the transverse flues I, said cylinders thus serving as the headers for the tubes I.

As shown, the furnace is substantially square in cross section, although any other desired form may be adopted; and on two sides of the furnace are arranged the header-cylinders G, H, while on the two remaining sides of the furnace, are located the large circulating pipes J, J', which are suitably connected to the ends of the header-cylinders and afford free circulation for the water in the steam generator. As the two cylinders G, H, are arranged in different horizontal planes the circulating tubes I and pipes J, J' are slightly inclined horizontally to afford a better circulation for the hot water and facilitate the separation of the steam generated in the boiler or generator; and it is calculated that the heat passing from the producer furnace will be sufficient to generate steam enough in the boiler for the operation of the engine, or several smaller engines, required to do all the mechanical work in connection with the plant, such as driving the independent air blowers, pump the water into the steam generator, to elevate coal to bins or pockets, at a proper elevation, to allow it to run into the chutes of the producer furnace and the hopper of the gas-generator furnace, to shake the grates and run the conveyers to remove the ashes from the two furnaces, and operate the elevators, &c. This superheater consists of connected sets of coils and flues K, K' respectively, the upper set of coils K being composed of zig-zag tubes which are connected to the exhaust steam receptacle G', and the lower set of flues K' consisting of the refractory flues designed to receive the steam, by a special header provided in the walls of the furnace, from the lower discharge ends of the zig-zag coils K, and to deliver the superheated steam into a conduit which discharges the same directly upon and in contact with the bed of incandescent fuel in the water-gas generator furnace. The lower flues K' of the steam superheater, which are exposed to the most intense heat in the producer furnace, are made or composed of refractory material to prevent them from deteriorating under the action of such intense heat, while the upper sets of coils K may be made of metal. The coils and flues of the steam superheater are arranged horizontally, or transversely to the height of the producer furnace, and they are thus subjected to direct contact with the intense heat generated by the combined combustion of the solid fuel and the products of combustion resulting therefrom, so as to superheat the steam to the proper temperature without permitting it to come in direct contact or intermingle with the heat and products of combustion in the producer furnace. The refractory flues K' of the steam superheater exceed in number the zig-zag coils K immediately below the steam generator, because such refractory flues are capable of withstanding the heat to better advantage than the metallic coils and of imparting a greater percentage of heat to the steam as it passes through the superheater; and the lowermost series of flues, K', discharge into the horizontal connecting conduit L formed by a metallic, refractory-lined shell that connects the primary producer-furnace A with the gas-generator furnace M.

Below the grates in the producer furnace A is an ash-pit 1, having its walls inclined or slanted inwardly from the top toward the common ash-pit 2 which extends along the bottom of the producer-furnace A and the gas-generator furnace M, and which pertains to both furnaces. In this general ash-pit of the two furnaces operate several screw conveyers 3, 3, which extend substantially the whole length of the common ash-pit 2 to convey the ashes and refuse from the ash pits of both furnaces A, M, and deposit the same into a general ash-pit (not shown) from which the ashes may be conveyed by an elevator or other contrivance which I have not deemed it necessary to illustrate. As the producer-furnace A is larger than the gas-generator furnace M, and is designed to contain a larger fire bed in order to properly supply heat necessary to generate the steam in the boiler and superheat the steam passing through the superheater, it is advisable to provide the producer furnace A with a larger number of screw conveyers than are provided in the ash-pit 2 common to both furnaces, and in Fig. 2 of the drawings I have shown the ash-pit of such producer furnace as provided with two additional screw conveyers 4, located on opposite sides and in the same horizontal line with the common screw conveyers 3, 3, of the two furnaces. By providing the common ash-pit 2 below the level of the ash-pit 1 of the producer furnace A, a sufficient quantity of ashes is always contained within the ash-pit 1 to form a seal below the grates and prevent the lower air-blast from escaping through the ash-pits, thus avoiding waste and preventing the diminution of the strength of said lower air blast.

I will now proceed to describe in detail the construction of the gas-generator furnace M shown in Figs. 1 and 3 of the drawings. The lower part of this generator furnace M consists of a metallic vertical column 5 and an ash-pit 6 which are flanged and bolted together as shown, the ash-pit 6 being inclosed within a jacket of refractory material 7. I preferably make three of the walls of the ash-pit vertical, but the rear wall, 8, thereof is slanted or inclined toward the general ash-pit, see Fig. 1, to cause the ashes to be deflected upon the screw conveyers 3 which are thus enabled to remove the ashes to better advantage from the generator-furnace. The vertical column 5 of said generator furnace is made substantially uniform in width throughout its length, and at its upper end said column is flanged and flared, as at 8', to adapt it to receive and support the body 9 of said generator furnace. This body 9 of the generator furnace is preferably constructed of a suitable refractory material, preferably of fire brick, and inclosed within a metallic jacket; and the lower part of said body is flared outward as at 10 from its lower extremity to a suitable point. From this outward flared part 10 at the lower part of the body 9, two of the sides rise in vertical straight lines, as at 11 in Fig. 3, while the other two sides are slanted or inclined inward, as at 12 in Fig. 1; and from these parts 11, 12, the sides of the body have a general inward and upward slope to the top of the body. The top of this generator-furnace is surmounted by a metallic cap 13 suitably bolted or otherwise secured to the body 9; and this cap contains a double-tapered or cone hopper 14 into which fine coal, or other fuel, is supplied, said hopper being normally closed by a tightly-fitted cover or valve 14' which is suspended by a chain 15 from a lever (not shown) or other device which enables the valve to be easily opened to introduce fuel therein. The vertical column 5 of the generator furnace sustains a rocking grate which consists of two horizontal sections 16, 17, supported by independent shafts and arranged one above the other, with their ends overlapping each other; and these grate sections are linked together, at 18, and designed to be operated by a cam (or cams) 19 on a shaft 20 which is suitably journaled in bearings on the vertical column and has its outer end protruding through said column to adapt devices to be connected thereto which are operated from an engine, or one of several engines, of the plant. The shaking grate 16, 17, forms the support for the incandescent bed of fuel in the gas-generator furnace, and the tightly closed column 5 is designed to contain a mass of ashes below said grate or fuel-support to form a seal and prevent the rapidly-passing current of steam or gas from passing through the grate and the column.

In the vertical sides 11, 11, of the body 9 of the generator-furnace M are provided diametrically-opposite openings 22, 22, and in these openings are secured fine refractory gratings 23 which permit of the free passage of the superheated steam and water-gas, but at the same time prevent, the passage of ashes with said currents. The openings 22, 22, and gratings 23 are in direct horizontal line with the connection L between the producer and generator furnaces A, M; and to the generator-furnace M is connected an outlet pipe 30 which is arranged in line with and receives the water-gas from the grated opening 22. The outlet pipe is adapted to convey the water-gas to a suitable gas-holder (not shown); and in said outlet pipe is provided a baffle plate 31 which depends from the upper side of the pipe into the path of the rapidly moving gas, the object of which is to cause the gas impinging against the plate to have a downward curve and to cause the ashes, which may be carried from the bed of incandescent fuel in the generator-furnace M by the gas, to become separated from the current of gas and be precipitated into an ash-pipe 32 which depends from the lower side of the outlet pipe immediately below the baffle-plate, said ash-pipe being provided with a valve 33, by opening which the ashes that accumulate in the upper part of the pipe can be discharged into a suitable receptacle placed under the end of the pipe. If preferred, one or more zig-zag coils of air heating pipe may be provided in the stack of the producer furnace above the steam generator therein, and this coil may be connected to the pipe f between the air forcer F' and the upper flue F so as to utilize a part of the heat escaping from the stack. The heat lost by conduction from the generator furnace M may also be partially utilized by providing air passages in the refractory lining of the body 9 of said furnace, and either or both of the furnaces may be water jacketed for the purpose of generating steam, the hot air and steam being used for any suitable purpose, as will be readily understood.

This being the construction of my apparatus for rapidly manufacturing water-gas, the operation may be described as follows:— The steam generator having been filled with water to the water line indicated by Fig. 1, and the ash-pit door opened, a slow fire is started in the basket grates B, B, of the producer furnace A, and it is very gradually and carefully increased in order to heat and expand the interior devices of the furnace slowly and uniformly. The fuel, preferably coke to start with, is added gradually through the fuel chutes until the furnace is full, but leaving the upper parts of the chutes open for the admission of air to mix with and burn the carbonic oxide gas as it rises from the fuel. As soon as the pressure of the steam in the boiler is sufficient, the ash-pit door is closed and enough fuel is supplied to close and seal the feed-chutes, and the two piston blowers are started and run at the speeds necessary to give the best results in making and burning the fuel or producer gas and in quantity proportioned to the amount of water gas required as will be made apparent by the rise and fall of the gas holder which receives the gas from the apparatus previous to its distribution. While the steam superheater in the furnace A is being gradually heated up to a continuous working condition, the exhaust steam from the engines is allowed to escape freely into the atmosphere. In the meantime, the ash-pit door of the water-gas generator-furnace being open, a coke fire is started in the furnace on the grates 16, 17, the upper part of such furnace being unfilled with coal and the hopper valve 14' being open so that the smoke and products of combustion can escape through the hopper 14, after which the fire is increased until there is a mass of incandescent coke, of the requisite depth, say eighteen inches or more, above the top of the tile gratings, after which the upper part or neck of the generator furnace is to be filled with "run of the mine" coal and slack, nut coal and slack, or all slack coal, as may be desired. The ash-pit door, the hopper-valve, and all parts of the gas-generator furnace being closed air-tight, and all parts of the superheater in the producer-furnace being of the required temperature, which can be maintained at about 2,500° Fahrenheit, because the temperature in the combustion chamber D will be 3,000° or 4,000° when in regular full operation, the exhaust steam from the engines, in moderate quantity at first, is admitted into the exhaust steam receptacle G'. The exhaust steam now passes into the coils K and thence to the refractory flues K', in which the steam is intensely superheated, and it emerges through the lower flues K' into the connecting pipe L at a temperature of nearly 2,500°; and such intensely superheated steam then passes directly through and in contact with the body of incandescent fuel with the following result: A volume of oxygen in the steam combines with an equal volume of carbon vapor, abstracted from the incandescent coke by the action of the superheated steam thereon, thereby producing two volumes of carbonic oxide gas. The hydrogen, set free from the steam by the oxygen leaving the same to combine with the carbon vapor, now combines with the carbonic oxide gas, thus forming the water-gas, which passes out of the generator furnace through the outlet pipe and thence into the gas holder.

My process of generating water gas is continuous from the fact that the steam is intensely superheated, in the coils and refractory flues of the superheater within the producer furnace, above the temperature of the bed of incandescent fuel in the gas generator furnace, and such intense superheating of the steam is maintained at all times, and is rendered possible by the construction of the producer furnace which is especially designed for this purpose, so that a continuous supply of intensely superheated steam of a temperature above the temperature of the bed of incandescent fuel into which it is injected is insured in order to prevent decreasing the temperature of the incandescent bed of fuel and discontinuing the process to blow up the bed of incandescent fuel and keep it bright, the ashes from the bed of fuel in the generator furnace being precipitated into the hollow column of said generator furnace by shaking the grates from time to time. These grates in the gas generator furnace incline toward each other and are connected together near their inner ends in a manner to leave a space between them for fire clay, clinker and other refuse to pass out, said grates being capable of free motion vertically to keep ashes from collecting among the incandescent fuel and affecting the efficiency of the generator.

It will be observed from the foregoing description, taken in connection with the drawings, that the steam superheater in the upper part of the producer furnace consists of a coil of metallic or other pipes and a larger coil or series of refractory flues or pipes below the metallic coil and subjected to the most intense heat in such producer furnace. I have estimated that the whole surface of such metallic and refractory pipes or flues forming the superheater exposed to the heat in the producer furnace will approximate two thousand two hundred and thirty-five square feet of surface, and the temperature of the products of combustion at the bottom of the superheater will approximate 2,500° Fahrenheit, and 1,000° Fahrenheit, at the top of said superheater, although the temperature at the bottom of the superheater around the refractory pipes or flues may be increased to 3,000° Fahrenheit, or upward by the pressure blowers. I also estimate that two thousand feet of steam at a temperature of 212° Fahrenheit, will be heated to 600° Fahrenheit, in passing through the metallic coils of pipe in the upper part of the superheater within the producer furnace; and as this steam, at the temperature stated passes through the refractory coils or flues at the lower part of the superheater, and which are subjected to a temperature of not less than 2,500° Fahrenheit, the steam will be heated to a temperature of not less than 2,200° Fahrenheit. As this intensely superheated steam passes from the refractory flues in the producer furnace directly into the incandescent bed of fuel at a temperature above that of the bed, it will not abstract any heat from said incandescent bed, but on the contrary the heat of the incandescent bed will be materially increased by the oxygen of the superheated steam separating from the hydrogen therein and combining with the carbon vapor of the fuel. The additional heat thus generated serves to distill the hydrocarbons, from the coal above the incandescent coke already formed, the vapor of which, in order to escape, is forced to pass through the incandescent coke, and in doing so is converted into carbureted hydrogen which increases the illuminating power of the water gas.

I am aware that modifications and alterations in the form and proportion of parts and details of construction of the apparatus herein shown and described as an embodiment of my invention can be made without departing from the spirit or sacrificing the advantages of the same, and I therefore reserve the right to make such changes as fairly fall within the scope of my invention.

My apparatus is designed to act continuously, as it burns large quantities of fuel rapidly, generates an intense heat in the producer furnace, and superheats the steam proportionately fast, thereby generating an exceedingly large volume of gas within twenty-four hours.

By the use of the basket grates B, B, the area of grate surface in the producer-furnace is materially increased, being about twice the grate area of a furnace having the ordinary level grates, and a great deal more fuel can be burned, without forming clinkers, and thus contribute largely to the increased production of gas.

Having thus fully described my invention, what I claim as new, and desire to secure by Letters Patent, is—

1. In an apparatus for manufacturing water-gas, the combination of a producer furnace having an interior steam superheater, comprising the coils K and the refractory flues or coils K' situated below the coils K and within the combustion chamber of said producer furnace; a separate gas-generator furnace adapted to contain a bed of incandescent fuel, and an intermediate connection between the refractory superheater-flues of the producer furnace and the combustion chamber of the generator furnace to conduct the superheated steam from the superheater of the producer-furnace directly into the incandescent fuel of the gas-generator furnace, as and for the purpose described.

2. In an apparatus for manufacturing water-gas, the producer-furnace containing a fuel support, the combustion chamber, and a steam superheater, the latter comprising an upper series of coils K and a lower series of refractory flues or coils K' which receive from the upper coils and are situated above and within the combustion chamber of said producer furnace, combined with a gas generator furnace having fuel-supports for sustaining a bed of incandescent fuel, and a connecting pipe or flue which receives steam directly from the refractory flues or coils K' of the superheater and discharges the steam into and through the bed of incandescent fuel in said gas-generator furnace, whereby steam is intensely superheated in the producer furnace without contact or intermingling with the products of combustion therein, as and for the purpose described.

3. In an apparatus for the manufacture of water-gas, the producer-furnace containing the fuel support near its lower part, a steam superheater arranged above said fuel support and comprising the upper coils K and the refractory flues or coils K' which receive from said upper coils K and are arranged below the same, and a combustion chamber situated between said superheater and fuel support and having air-inlets for the purpose of commingling an air-blast with the products of combustion immediately below the superheater, combined with a gas-generator furnace, and a connecting flue or pipe which receives steam directly from the refractory flues or coils of the superheater and conducts the same into direct contact with a bed of incandescent fuel contained in said gas generator furnace, substantially as and for the purpose described.

4. In an apparatus for manufacturing water-gas, the producer furnace provided with the fuel supports, the steam generator having its parts situated around and within the upper part of said producer-furnace, the steam superheater situated wholly within the upper part of the producer-furnace and comprising the upper series of coils K and the lower series of refractory flues or coils K' which receive from said upper coils, the combustion chamber between the fuel supports and said refractory flues or coils of the superheater, and the independent air flues having two series of outlets arranged to supply separate blasts of air to the combustion chamber and to the solid fuel on the fuel supports, as and for the purpose described.

5. In an apparatus for manufacturing water-gas, the producer furnace provided in its upper part with a steam generator, the fuel supports in its lower part, a combustion chamber situated above said fuel-support, a steam superheater situated between the steam generator and the combustion chamber and having the upper coils K and the refractory flues or coils K' arranged below said upper coils and exposed to the direct action of the intense heat in said combustion chamber, an air-blast conduit provided with a multiplicity of passages arranged to discharge streams of compressed air directly into said combustion chamber, and another air conduit for supplying an air-blast to the solid fuel on the fuel-support, as and for the purpose described.

6. In an apparatus for manufacturing water-gas, the producer-furnace embracing, in combination, the fuel supports, the combustion chamber above the same, and the steam superheater arranged wholly within the upper part of said producer-furnace and having its refractory flues or coils exposed to the direct action of the intense heat in the combustion chamber, with an air blast conduit within said furnace and having a multiplicity of passages arranged to discharge streams of compressed air into the combustion chamber on all sides of the same, another independent air-blast flue also situated within said furnace and discharging to the fuel on the fuel supports, and independent air-blowers or forcing mechanisms connected separately to the two blast conduits in said furnace, as and for the purpose described.

7. In an apparatus for manufacturing water-gas, the improved producer-furnace having the fuel-supports at its bottom, the steam generator having its cylinders G, H, seated externally on the upper part of said producer-furnace and connected by the external circulating pipes and the inclined tubes I which extend through the upper part of said furnace in the direct path of the escaping products of combustion, the steam superheater arranged wholly within the upper part of said furnace, below the tubes I of said generator, the combustion chamber D between the fuel supports and said superheater, and the air-blast flues having independent discharge ports to said combustion chamber and the fuel supports, substantially as described.

8. In an apparatus for manufacturing water-gas, the improved producer-furnace having the steam generator consisting of the horizontal cylinders resting on the saddles on top of said furnace-walls and connected by the inclined circulating flues and pipes, the superheater within said furnace, the fuel-supports, the combustion chamber, and the air-blast flues, arranged to discharge the blasts of air to the combustion chamber and the fuel on the fuel-supports, substantially as described.

9. In an apparatus for manufacturing water-gas, the improved producer-furnace having the steam box, the superheater arranged within said furnace and having the zig-zag coils connected at one end with said steam box and the refractory flues arranged below and connected to said zig-zag coils, the combustion chamber below said superheater and containing the lower part of the refractory flues of said superheater, the fuel supports, and the air-blast flues, arranged to discharge the blasts of air to the combustion chamber and the fuel on the fuel-supports, substantially as described.

10. In an apparatus for manufacturing water-gas, the combination of a producer-furnace containing a steam superheater, the fuel-supports, and an ash-pit, a gas-generator-furnace having a fuel-support and the ash-pit, a common ash-pit connected to the ash-pits of the two furnaces, the conveyers arranged in said common ash-pit for removing the ashes from both furnaces, and a connecting pipe arranged to receive steam from the steam superheater and to deliver the same directly into a bed of incandescent fuel on the fuel support of the gas-generator furnace, substantially as described.

11. In an apparatus for making water gas continuously, the producer furnace constructed with basket grates and inclined shaking grates, a steam superheater situated a suitable distance above said grates and leaving an intermediate combustion chamber D between the grates and said superheater, and air flues for supplying blasts of air to the combustion chamber and the fuel on the grates, combined with a gas generator furnace constructed with shaking grates and with the grated openings in opposite sides thereof and above the shaking grates therein, and the horizontal conduit connecting said superheater and generator furnace to convey the superheated steam in a horizontal path directly into the incandescent fuel through one of said tile gratings in the gas-generator furnace, one of said tile gratings being for the ingress of the intensely superheated steam, and the other tile grating for the egress of the water-gas resulting from the decomposition of the steam by the union of its oxygen with the incandescent carbon of the fuel and the release of its hydrogen, substantially as and for the purpose described.

12. In an apparatus for manufacturing water-gas, the producer furnace constructed with a combustion chamber, the basket and shaking grates below said combustion chamber, the air-flues for supplying independent blasts to said chamber and grates, the steam superheater above said combustion chamber and having the high temperature refractory flues subjected to the intense heat of said combustion chamber, and the headers seated externally on the walls of said producer furnace and connected by the inclined flues which lie above the steam superheater and are exposed to the direct action of the products of combustion passing through said producer furnace, combined with a gas generator furnace constructed to contain a bed of incandescent fuel, and the horizontal conduit which conducts steam from said superheater directly into the incandescent bed of fuel in the gas-generator furnace, substantially as and for the purposes described.

13. In an apparatus for manufacturing water-gas, the producer furnace constructed with the combustion chamber, the basket and shaking grates below said chamber, the air-flues arranged to supply blasts independently to said grates and to the combustion chamber, the steam superheater having its externally-heated, high-temperature, refractory-flues and the upper coils arranged within said producer furnace to conduct steam therethrough substantially at right angles to the path of travel of the products of combustion through said furnace, combined with a gas generator furnace constructed to contain a bed of incandescent fuel, and the horizontal conduit connected with said superheater to convey the superheated steam in a horizontal path directly into the incandescent bed of fuel, substantially as described.

In testimony whereof I affix my signature in presence of two witnesses.

JOHN R. PETERS.

Witnesses:
 I. SHAW,
 WINFIELD S. MOORE.